July 7, 1959  L. K. GULTON  2,893,707
METHOD OF ULTRASONIC TREATMENT AND DEVICE
Filed Aug. 29, 1955
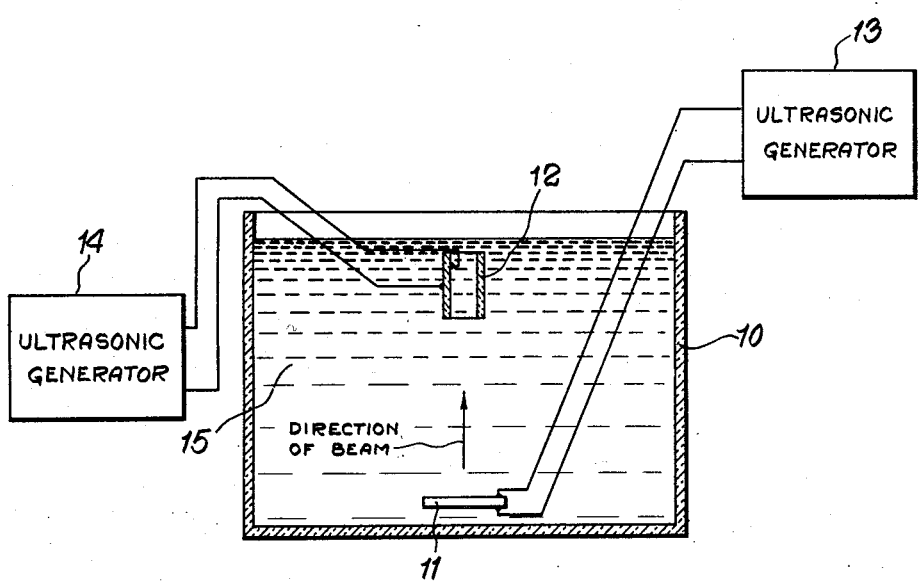
INVENTOR.
LESLIE K. GULTON
BY
ATTORNEY

2,893,707

METHOD OF ULTRASONIC TREATMENT AND DEVICE

Leslie K. Gulton, Metuchen, N.J.

Application August 29, 1955, Serial No. 531,089

6 Claims. (Cl. 259—1)

My invention relates to a method for utilizing ultrasound waves to produce emulsification, to alter biological organisms or to otherwise treat material as well as to a device for carrying out the method and in particular to a method which employs more than one transducer and more than one ultrasonic frequency.

An important object of my invention is to provide a method, employing ultrasound waves, for emulsifying liquids economically and simply.

A further object of my invention is to alter biological organisms by means of the enhanced unidirectional mechanical forces produced by more than one source of ultrasonic energy.

A still further object of my invention is to provide a device for carrying out the method.

Other objects and advantages of my invention will be apparent during the course of the following description.

Previously, it has been found that it has been possible to emulsify certain liquids and oils by subjecting the combination to ultrasound waves of fairly high intensity. These earlier techniques made use of a single transducer which was excited at a single ultrasonic frequency or, more rarely, by a scanned or "warbled" frequency group. In addition to being used for emulsification, these methods are utilized for mixing, agitation, cleaning, chemical activity and like operations. The transducer employed is generally driven from a single ultrasonic generator and may be excited and adjusted in order to produce various beam and intensity patterns and directional effects.

I have discovered that there are certain operations which cannot be carried out by a single transducer which is excited by a single ultrasonic frequency or over a band of ultrasonic frequencies. I have also discovered that many of these operations may be accomplished when more than one transducer is used. In such cases, the transducers are excited and driven at different single frequencies or over different bands of frequencies.

Several effects may be made use of when more than one transducer is employed. The two sound pressures may be additive, thereby producing higher liquid cavitation levels than are possible with a single transducer. Two frequencies operating together can produce much higher unidirectional flow forces than one transducer operating alone. The several transducers also cooperate so as to vary the local energy and beam distribution of the resultant ultrasonic energy and thereby produce high ultrasonic intensity regions. One or more transducers may set up a local barrier which acts to restrict the ultrasonic radiation flow of another transducer. Another advantage lies in the proper selection of frequencies whereby the initial stages of emulsification are enhanced by the first transducer frequency and the final emulsification is brought about primarily by the second frequency.

By way of example, and in nowise by way of limiting the scope of my invention, the figure illustrates, partly in cross-section, a preferred embodiment of my invention which was employed to obtain the dispersion of oil in water.

The numeral 10 designates the tank in which is inserted high frequency transducer 11 and low frequency transducer 12. High frequency transducer 11 is driven by ultrasonic generator 13 and low frequency transducer 12 is driven by ultrasonic generator 14. The liquid is designated by the numeral 15.

By way of illustrating my invention but without any limitation because of the use of particular stated values, following is a typical example of the use of my invention.

Transducer 11 is a 2" focused transducer whose major transmission lobe is in the direction of the arrow in the figure and which is excited by ultrasonic generator 13 at a frequency of 3 megacycles which is the resonant mode of 11. 11 is placed so that its beam is directed upwards toward transducer 12, as indicated by the arrow in the figure. The power output of ultrasonic generator 13 is approximately 100 watts. Transducer 12 is a hollow cylinder approximately 4" in diameter with a radial resonant mode of approximately 10 kilocycles. 12 is mounted with its axis vertical and directly over the radiating surface of 11. Transducer 12 is driven at 10 kilocycles with a power of approximately 300 watts by ultrasonic generator 14. I was able to obtain dispersion of oil particles in liquid 15 in approximately 5 minutes by the method of my invention and it was impossible to obtain dispersion when utilizing transducer 11 alone with a power output of 13 which was three times that which was used when both transducers were excited. It was possible to obtain some dispersion when transducer 12 was used alone but it took a considerably longer time and the dispersion was in nowise as uniform as that obtained when using the method of my invention.

The transducers used may be natural or artificially polarized piezoelectrics, electrostrictive or magnetostrictive. My invention is not limited as to the type of transducer employed. In the example given, the transducers were artificially polarized piezoelectric ceramics composed largely of barium titantate. When using two transducers it is desirable to provide for positioning of the transducers over a distance at least equal to the longer wavelength in order to adjust the phase of the resultant sound waves correctly.

More than two transducers may be employed to carry out the teachings of my invention and the ultrasonic generators may have outputs which are scanned or "warbled" in lieu of the single frequency outputs hereinabove described. The number of combinations, which may be obtained and constructively utilized, is limited only by the particular application and the imagination of the user. In certain applications it is desirable to have one transducer operating on an even harmonic of the other. However, in most cases the frequencies need not have any specifically fixed relation to each other.

While I have described my invention by means of specific examples and in a specific embodiment, I do not wish to be limited thereto, for obvious modifications will occur to those skilled in the art without departing from the spirit of my invention or the scope of the subjoined claims.

Having thus described my invention, I claim:

1. The method of ultrasonic treatment of a liquid which comprises simultaneously applying ultrasonic excitation at at least two ultrasonic frequencies and thereby producing high level agitation of the liquid being treated, the source of one of said ultrasonic excitation frequencies being located in the beam of the source of a second of said ultrasonic excitation frequencies.

2. The method of ultrasonic treatment as described in claim 1 wherein there are two such agitation frequencies.

3. The method of ultrasonic treatment as described in claim 2 wherein one of said frequencies is approximately 300 times that of the other of said frequencies.

4. An ultrasonic device comprising at least two electro-mechanically sensitive bodies and at least two ultrasonic generators operating at different frequencies; each of said ultrasonic generators exciting at least one electro-mechanically sensitive body; said electromechanically sensitive bodies being positioned such that one of said electro-mechanically sensitive bodies is located in the beam of another of said bodies which is excited at a different frequency from that at which the first said body is excited.

5. An ultrasonic device as described in claim 4 wherein there are two such electro-mechanically sensitive bodies.

6. An ultrasonic device as described in claim 5 wherein the frequency at which one of said electro-mechanically sensitive bodies is excited is approximately 300 times the frequency at which the other of said electro-mechanically sensitive bodies is excited.

References Cited in the file of this patent

UNITED STATES PATENTS

| | | |
|---|---|---|
| 2,292,555 | Wesch | Aug. 11, 1942 |
| 2,309,033 | Baily | Jan. 19, 1943 |
| 2,717,768 | Carpentier | Sept. 13, 1955 |

FOREIGN PATENTS

| | | |
|---|---|---|
| 1,068,360 | France | Feb. 3, 1954 |